Oct. 16, 1956     R. S. JONES     2,766,846
SEPARATING SYSTEM
Filed Dec. 14, 1953
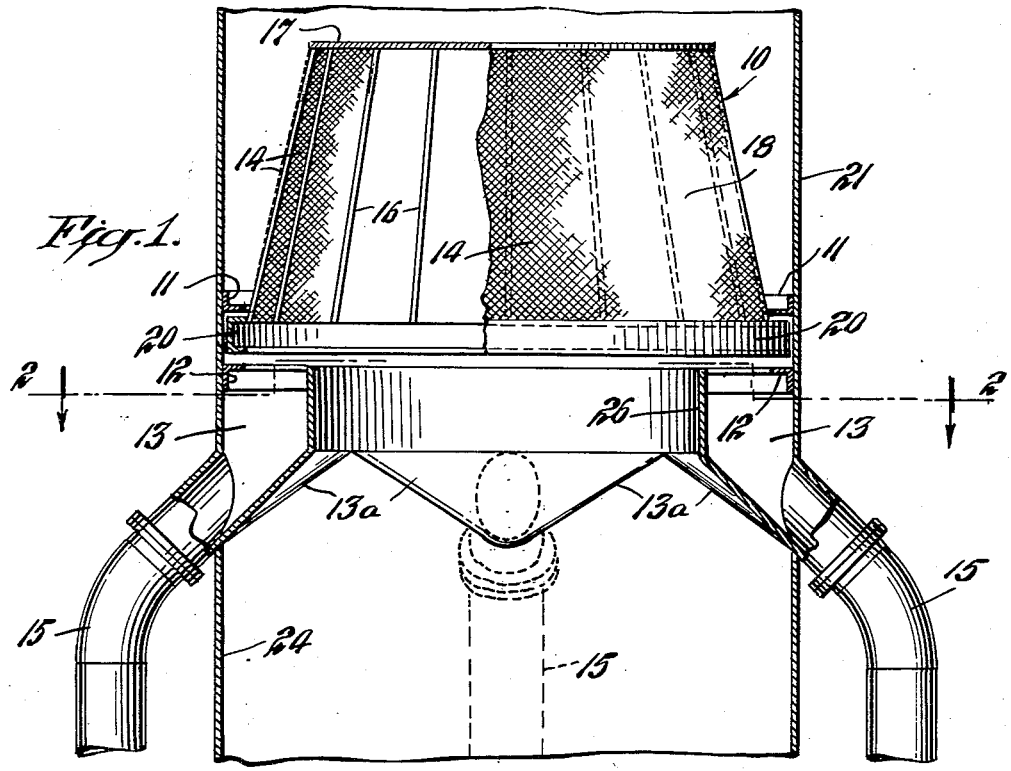
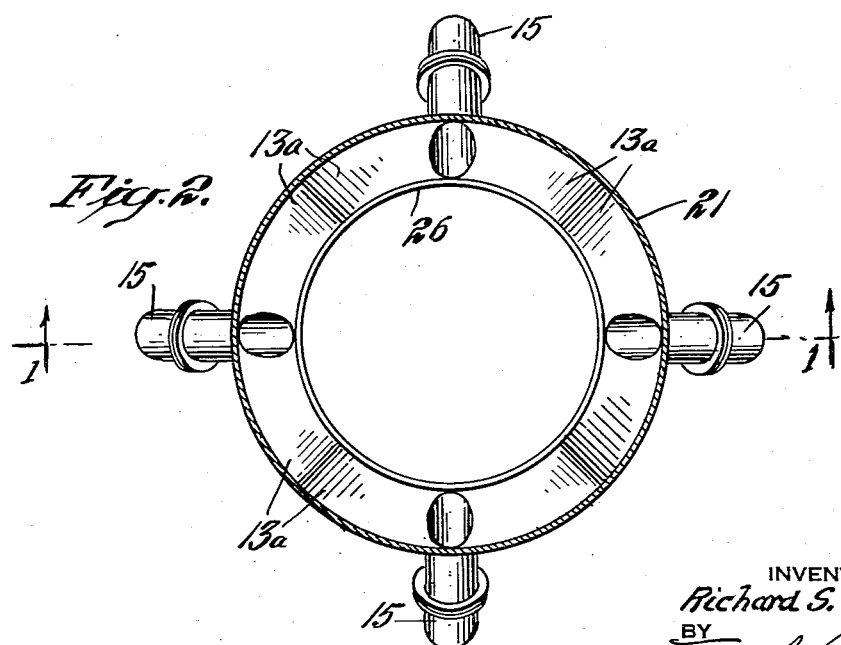
INVENTOR
Richard S. Jones
BY
Frank A. Bower
ATTORNEY 2,766,846

SEPARATING SYSTEM

Richard S. Jones, Bayside, N. Y., assignor to
Donald B. Adams, New York, N. Y.

Application December 14, 1953, Serial No. 397,809

1 Claim. (Cl. 183—58)

This invention relates to the separation of foreign matter from vapors or air and particularly to the separation out of which particles by a screening action and with continuous dislodgement of accumulated layers of the particles as the gases pass through the screening means.

The object of the invention is to provide a self-contained system receiving the loaded gases and using them to deposit out the contaminating particles and at the same time to aid in dislodging them from the screening means so as to continuously clear the latter for passage of the gases. The apparatus involved is thus self-clearing and automatically separates out and delivers the solid particle content of the gas stream.

Further objects of the invention particularly in the development of operating pressures by the passing gases acting to lift and vibrate the screening means will appear from the following specification taken in connection with the accompanying drawings, in which Fig. 1 is a vertical sectional view of a typical separating apparatus employing the system, taken on the line 1—1 of Fig. 2, and Fig. 2 is a plan view on reduced scale of the apparatus shown in Fig. 1.

This invention involves a self-contained method of separating fluid catalyst from vapors under heat, or any foreign matter from vapors or air by means of a floating screen basket 10 with top and bottom stops 11, 12 spaced to create sufficient knocking in upper and lower movement to dislodge the filtered material to drop into troughs 13 directly below the perpendicular side of screen 14 and run through inclined pipes 15 to outside of tower or drums.

The basket 10 would consist of a light frame 16 of proper material for strength and temperature with top 17 closed and sides 18 covered with screen 14 or perforated sheet metal with perforation of size to retain the solids in the vapor. The bottom rim 20 should be guided by close fit in the tower shell 21 with top and bottom ring stops 11, 12 separated only sufficiently to get required knocking to dislodge the filtered material, the slope of the sides 18 are approximately 1–5, with the annular collecting trough 13 directly below the upper part of the inside of the slanted sides of the basket. The trough surfaces 13a will be sloped in proportion to the material to be filtered to insure a natural flow toward the take off pipes 15 from the tower.

The function of this type of separator would be double acting depending on design and material handled, one design would permit the solids to build up on the inside of screen and float the basket to top stop 11 taking advantage of layer of filtered material to get the fines that ordinarily pass through and when sufficient material collects on screen it will drop and dislodge into the trough below; another design would be to permit the basket sides to be filled up so that pressure lifts basket to the top stop 11 and shakes loose the adhered material. The basket 10 will then drop down and shake the remaining part of the material. Several of these units can be installed in each tower if size of basket is prohibitive but the more units involved the more complicated the collecting troughs become.

The design of this shape of basket would permit any free area desired, and a circular trough around the inside of tower would have a tendency to direct the vapors directly at the screen and the movement of the vapors guide the falling filter material toward the inside of troughs. This separator would be extremely useful to recover light material that is ordinarily exhausted to atmosphere and ultimately lost in handling.

The gases passing through the screening means 14 will be passed on upward for discharge from the tower 21 in purified condition, the pressure on the discharge side of the basket 10 being maintained low to keep a sufficiently strong differential through the screening. The rim 20 will preferably be sealed against leakage as by flexible sealing rings permitting the floating movements of the basket 10 while preventing by-passing of the fresh gases around the screening means.

This system may also provide the basket with power vibratory means such as solenoids, the oscillating cores of which engage the rim 20 at distributed points, maintaining the basket 10 in a constant state of agitation. Such vibratory impulses may be radially transverse or, preferably, with an axially upward component imparting vertical reciprocation of predetermined range to the basket which may be left freely floating between the limits provided, for instance, by the stops 11, 12.

In the specific embodiment shown the gases passing upward through the lower tower portion 24 are concentrated by the trough structure 13a and ring 26 to a rising column directed against the top 17 of the basket 10 and spreading outward all around and along the inclined screening 14 to flow outward therethrough as the floating particles are caught and accumulate on the screening. These particles build up on the screening tending to restrict the pores and increase the pressure within the basket, while at the same time the vibration of the basket tends to dislodge the accumulations with increased effect as they grow to greater depth on the screen.

The type of screening and the strength of the vibration will vary with the materials involved and the principle of the separating action will remain the same to distribute the particle bearing gas by spreading over the inclined screening means under constant vibratory movements of the latter to shake off and shed accumulated, screened-out material and collect it in the trough means and discharge outlets while the cleared gases pass on to the upper chamber.

While the system of this invention has been described in reference to a specific embodiment, it is not confined thereto but is intended to cover such modifications thereof as fall within the scope of the appended claim.

I claim:

In a separating structure the combination with a tower of a coaxial annular ring structure inwardly spaced from the tower having a central opening for the supply of a gas-particle mixture, a trough means in the space between the tower and the ring structure and surrounding said ring structure and adapted to receive the particles, a detached freely floating screen structure forming an inverted basket having its lower peripheral edge loosely mounted above and adjacent said trough means and its upper portion above said central supply opening, and means supporting said basket in said position for free floating upward movements as a unit under the buoyant effect of the entering gases, and means for limiting the upward movement of said basket as a whole and adapted to exert a sharp impact in limiting its movements and thus tending to dislodge separated particles from said screen for discharge downward into said trough.

References Cited in the file of this patent

UNITED STATES PATENTS 2,368,828    Hanson et al. _____ Feb. 6, 1945

FOREIGN PATENTS

| | | |
|---|---|---|
| 62,908 | Austria | Jan. 10, 1914 |
| 449,025 | Great Britain | June 18, 1936 |
| 704,206 | France | Feb. 17, 1931 |
| 865,384 | France | Feb. 24, 1941 |